J. N. BODINE.
Devices for Uniformly Adjusting a Series of
Metal Lathe-Cutters.
No. 148,657. Patented March 17, 1874.
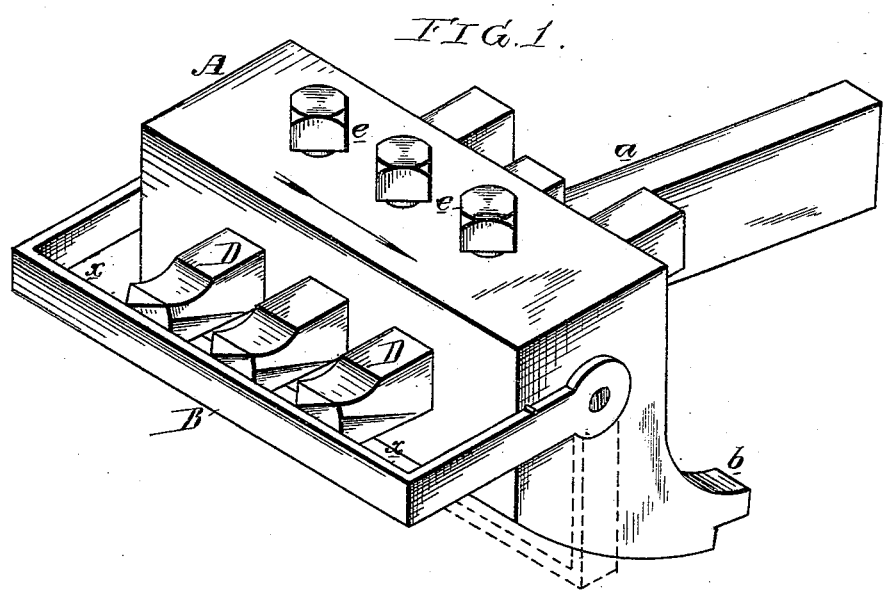
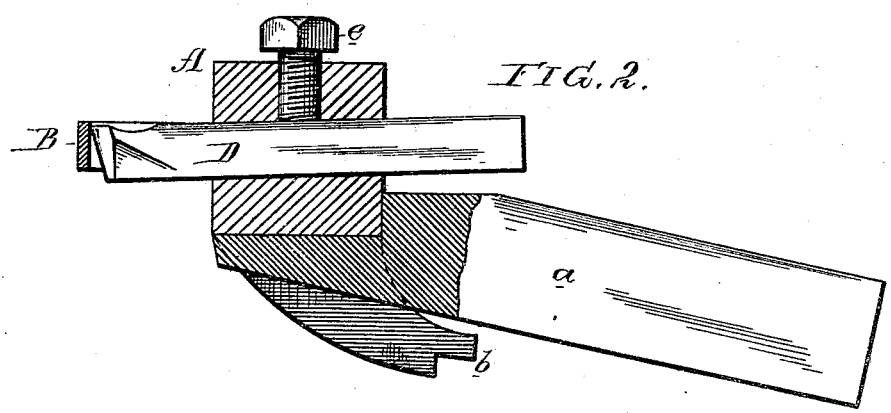
Witnesses, Hubert Howson
Harry Smith
Jeremiah N. Bodine,
By his Attys.
Howson and Son.
AM. PHOTO-LITHOGRAPHIC Co. N. Y. (OSBORNE'S PROCESS.)

UNITED STATES PATENT OFFICE.

JEREMIAH N. BODINE, OF BRIDGETON, NEW JERSEY.

IMPROVEMENT IN DEVICES FOR UNIFORMLY ADJUSTING A SERIES OF METAL-LATHE CUTTERS.

Specification forming part of Letters Patent No. 148,657, dated March 17, 1874; application filed February 2, 1874.

*To all whom it may concern:*

Be it known that I, JEREMIAH N. BODINE, of Bridgeton, Cumberland county, State of New Jersey, have invented an Improvement in Tool-Holders, of which the following is a specification:

The object of my invention is to use two or more cutting-tools on one slide-rest of a lathe or planing-machine, so that more work can be executed in less time than by a slide-rest carrying but one tool; and this object I attain by combining with a holder, A, carrying two or more tools, D, a bar, B, as shown in the perspective view, Figure 1, and sectional view, Fig. 2, of the accompanying drawing, the said bar enabling me to obtain that exact adjustment of the tools without which the employment of two or more on the same slide would be of no practical avail.

In the present instance the tool-holder A is furnished with a stem, $a$, for attachment to the usual tool-retainer of a slide-rest; but it should be understood, in the outset, that the block A may form a part of the rest itself. When the tool-holder is furnished with a stem, $a$, as shown in the drawing, it has projections $b$ bearing on some part of the slide-rest, so as to insure the lateral steadiness of the holder, which, in the present instance, has three separate holes, each having a tool, D, secured by a set-screw, $e$, in the usual manner. The three tools are intended to make cuts precisely alike, so that in turning any object—the face of a pulley, for instance—the slide-rest to which the tool-holder is attached, or of which the tool-holder forms a part, will have to traverse but one-third of the distance which a rest having but one tool would have to travel in completing the same width of face. In order that the cut made by one tool, however, shall exactly coincide with and merge into the cut made by the adjoining tool, it is essential that means be provided for the prompt and decisive adjustment of the tools in respect to each other. In order to insure exactitude of adjustment, I place in front of the cutting-points of the tools a bar, B, the inner face $x$ $x$ of which must be exactly parallel with the line of motion of the slide-rest. The bar is, in the present instance, hinged to the tool-holder A in such a manner that it can be permitted to fall out of the way; but it is immaterial how the bar is connected, either to the slide-rest or tool-holder, providing it can be adjusted to a position opposite the points of the tools, and providing its inner face, when thus adjusted, is parallel with the line of motion of the slide-rest.

All the tools are, in the first instance, adjusted so that their cutting-points shall be in contact with the bar B, when the latter is elevated, as shown in the drawing. After this adjustment, the bar may be permitted to hang down out of the way until one or more of the tools has to be removed, in order that it may be sharpened, when the bar must be again elevated in order to permit a readjustment of the tool or tools which had been removed.

It will be evident that my above-described invention is as applicable to a metal-planing machine as to a lathe.

I claim as my invention—

A tool-holder, A, adapted to or forming part of a slide-rest of a lathe or planing-machine, and carrying two or more tools, in combination with an adjusting-bar, B, all substantially as and for the purpose herein set forth.

In testimony whereof I have signed my name to this specification in the presence of two subscribing witnesses.

JEREMIAH N. BODINE.

Witnesses:
JOHN M. LANING,
HENRY STUART GREGORY.